Figure 1:
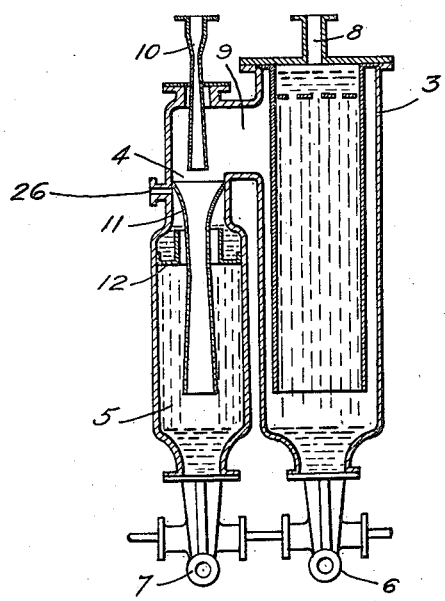

M. LEBLANC.
REFRIGERATING APPARATUS.
APPLICATION FILED SEPT. 27, 1910.

1,031,942. Patented July 9, 1912.

UNITED STATES PATENT OFFICE.

MAURICE LEBLANC, OF PARIS, FRANCE, ASSIGNOR TO SOCIÉTÉ ANONYME POUR L'EXPLOITATION DES PROCEDES WESTINGHOUSE LEBLANC, OF PARIS, FRANCE.

REFRIGERATING APPARATUS.

1,031,942.   Specification of Letters Patent.   Patented July 9, 1912.

Original application filed September 15, 1909, Serial No. 517,844. Divided and this application filed September 27, 1910. Serial No. 583,994.

*To all whom it may concern:*

Be it known that I, MAURICE LEBLANC, a citizen of the Republic of France, residing at Villa Montmorency, Auteuil, Paris, France, have made a new and useful Invention in Refrigerating Apparatus, of which the following is a specification, this application being a division of an application filed by me on September 15, 1909, serially numbered 517,844.

This invention relates to refrigerating apparatus and particularly to that type of apparatus in which the liquid to be cooled or frozen is partially evaporated in a chamber or receptacle in which a vacuum is maintained.

An object of this invention is to produce means for separating the air and other non-condensable gases from the liquid to be cooled prior to its admission into the cooling or vacuum chamber.

A further object is to produce means for separating the air and other non-condensable gases from the condensing water or liquid which may be employed in connection with the refrigerating apparatus.

A further object is to produce a refrigerating apparatus in which novel and improved means are employed for withdrawing the non-condensable gases from the vacuum chamber of the apparatus.

These and other objects I attain by means of an apparatus embodying the features herein described, and illustrated in the drawings accompanying this application and forming a part thereof.

Figure 2:
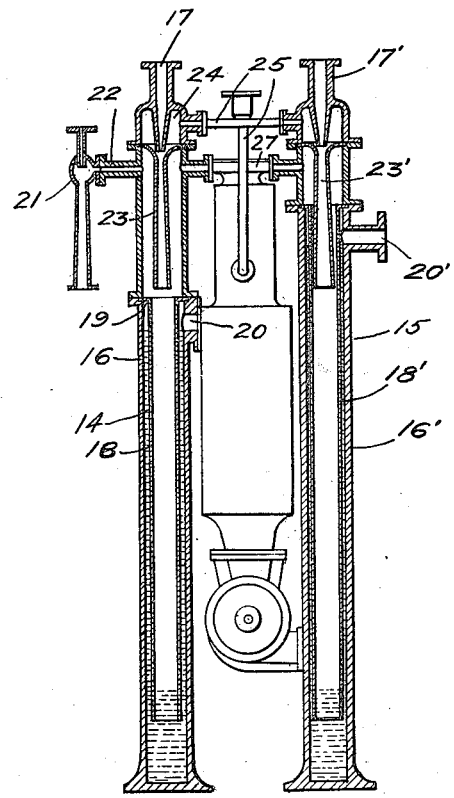

In the drawings, Figure 1 is a sectional elevation of a refrigerating apparatus to which an embodiment of my invention is applied. Fig. 2 discloses in section air or non-condensable gas separators applied to the refrigerating apparatus illustrated in Fig. 1.

It is a well known fact that water exposed to air absorbs some air and that the air so absorbed is readily given up or released when the water is exposed to a vacuum; consequently air is continually conveyed into a jet or injection condenser by the condensing water. In certain types of refrigerating apparatus, such for example as those in which the liquid to be cooled or frozen is first exposed to the air and then exposed to a vacuum, the same difficulty is encountered; that is, the liquid discharged into the apparatus continually conveys air into the vacuum chamber and this air must be removed in order to maintain a high degree of vacuum. It is always of importance to reduce the amount of air necessary to be withdrawn from the vacuum chamber, and this can be accomplished by means of my invention, an embodiment of which is illustrated in the drawings as applied to a Westinghouse-Leblanc refrigerating apparatus.

The refrigerating apparatus illustrated consists of a cooling chamber or receptacle 3, a fluid actuated ejector 4, a condenser 5 and liquid pumps 6 and 7. The liquid to be cooled or frozen is introduced into the receptacle 3 through a flanged port 8 which may communicate with a source of liquid supply through suitable piping (not shown). The liquid delivered to the apparatus by the port 8 is received by a chamber located at the top of the receptacle 3 and from which it is discharged in a finely divided state through the chamber 3. Either salt or fresh water may be cooled by the refrigerating apparatus by being partially evaporated in the chamber 3. Water so cooled collects in the bottom of the chamber 3 and is withdrawn by any suitable means, such for example, as the centrifugal pump 6. The fluid operated ejector 4 communicates with the receptacle 3 through a port or passage 9, located near the top of the receptacle, and is adapted to withdraw the air or other non-condensable gases and the vapor or steam from the receptacle 3 and discharge it into the condenser 5. The ejector consists of a suitable fluid delivery nozzle 10, which communicates through suitable piping (not shown) with a source of fluid under pressure and which discharges fluid into and through a convergent-divergent spout 11, the upper end of which communicates with the port or passage 9 and the lower end of which communicates with the condenser 5. Condensing water is introduced into the condenser through a port (shown in Fig. 2) and is discharged over an annular flange 12 through the condensing chamber. The flange 12 surrounds the spout 11 and the water is discharged through the condensing chamber in a finely divided state and is collected at the bottom of the chamber and discharged by any suitable means, for example, the centrifugal pump 7.

It will be apparent from an inspection of the apparatus illustrated in Fig. 1, that air is not only introduced into the condenser by the condensing water, but also by the water to be cooled; that is, by the water introduced into the chamber 3. It is, therefore, important that as much air as possible should be removed from the condensing water prior to its entrance into the condenser and also from the water to be cooled prior to its entrance into the receptacle 3. For this purpose I employ two separate air separators 14 and 15; the first for withdrawing air from the condensing water prior to its admission into the condensing chamber; and the second for withdrawing air or other non-condensable gases from the liquid to be cooled prior to its introduction into the chamber 3.

The separator 14 illustrated consists of a cylindrical casing 16 to which the condensing water is delivered through a nozzle 17 located in the top of the casing and in which the condensing water is exposed to a vacuum. A tube 18 is located concentrically within the casing 16 and the annular space between the tube and the casing is closed at the upper end by means of a flange 19 formed on the tube. A delivery port 20 for the condensing water is provided in the casing 16 below the flange 19, and the tube 18 extends almost to the bottom of the casing. The flow of water delivered by the nozzle 17 descends in a divided state through the tube 18, collects in the bottom of the casing and rises in the annular space around the tube 19, due to the difference in pressure between the condensing chamber 5 and the interior of the casing 16. The water is delivered to the condenser 5 through the port 20. A vacuum is established and maintained within the casing 16 by any suitable means, such for example, as a fluid operated ejector 21, which communicates with the casing through a flanged port 22. I find by experience, that by maintaining a pressure of $\frac{1}{5}$ of an atmosphere within the casing 16, the water flowing through the casing will become separated from about $\frac{4}{5}$ of the air or other non-condensable gases which may be dissolved in it, provided that the water is retained within the casing for a sufficient length of time. I contemplate maintaining a vacuum of about $\frac{1}{5}$ of an atmosphere in the apparatus illustrated, and consequently some air or non-condensable gas is delivered to the condensing chamber with the condensing water and also with the water to be cooled. I contemplate withdrawing the air from the condensing chamber by means of the flow of water entering and passing through the separators 14 and 15, and to this end I provide a divergent spout 23 in the upper end of the casing 16 which receives the flow of water delivered by the nozzle 17, and which forms a separate chamber 24 in the upper end of the casing 16. The chamber 24 communicates through a port and suitable piping 25 with an air delivery port 26 provided in the condenser 5. The flow of water discharged by the nozzle 17 and passing through the spout 23 is capable of withdrawing the air from the condensing chamber, compressing it and delivering it into the intermediate chamber of the separator 14 from which it is withdrawn by the fluid operated ejector 21.

The separator 15, provided for the liquid to be cooled, is similar in many respects to the separator 14, just described. Water is introduced into a cylindrical casing 16′ through a nozzle 17′ and is discharged downwardly through the casing and through a concentric tube 18′, which extends nearly to the bottom of the casing. A port 20′ is provided in the casing 16′, below the upper flange of the tube 18′, and communicates with the port 8 of the cooling chamber or receptacle 3. A divergent spout 23′ receives the water discharged from the nozzle 17′ and the space above the spout communicates with the port 26 of the condenser 5 and also with the chamber 24 of the separator 14 through the piping 25. The water in passing into and through the spout 23′ is effective in withdrawing the air from the condenser and of compressing it and delivering it into the intermediate chamber of the separator 15 from which it is delivered through suitable piping 27 into the intermediate chamber of the separator 14 and then discharged into the atmosphere by means of the ejector 21. With this arrangement, the major portion of the air and other non-condensable gases, dissolved in the liquid to be cooled and in the condensing water, are withdrawn prior to delivering the liquid and the water into the refrigerating apparatus and the velocity of flow of the liquid and water entering their respective separators is employed in withdrawing air and other non-condensable gases from the refrigerating apparatus and partially compressing it so that it can be more efficiently discharged from the separators by means of the ejector 21.

It will be apparent that one separator may be employed with a refrigerating apparatus, similar to the one illustrated when fresh water is employed both in the condensing chamber and in the receptacle 3. It will also be apparent that where steam is employed for operating the ejector 21 it may be utilized in heating the feed water of the boiler.

It will be understood that the invention is not limited to the particular construction and arrangement of parts herein described and illustrated, and that various modifications may be made in the construction without departing from the spirit and scope of my invention.

Having thus described my invention, what I claim is:

1. In combination in a refrigerating system, a cooling chamber to which liquid to be cooled is delivered, a fluid operated ejector communicating with said chamber, a condenser communicating with said ejector, a separator for withdrawing a part of the air or non-condensable gases from the liquid to be cooled, and means within said separator for withdrawing air or non-condensable gases from said condenser.

2. In combination with a refrigerating system, a cooling chamber to which liquid to be cooled is admitted, means for creating a vacuum within said cooling chamber, a separator for withdrawing a part of the air or other non-condensable gases from the liquid prior to its delivery to said chamber, and an ejector operated by the flow of liquid entering said separator for withdrawing air and other non-condensable gases from said vacuum creating means.

3. In combination in a refrigerating system, a cooling chamber to which liquid to be cooled is delivered, means for withdrawing vapor and non-condensable gases from said chamber, a condenser communicating with said means, a separator for withdrawing air and non-condensable gases from the liquid prior to its delivery to said chamber, and means operated by the flow of liquid entering said separator for withdrawing air and non-condensable gases from said condenser.

4. In combination with a refrigerating system, a cooling chamber to which liquid to be cooled is delivered, means for withdrawing vapor and non-condensable gases from said chamber, and a condenser to which condensing liquid is delivered communicating with said means, separators through which the liquid to be cooled and the condensing liquid pass prior to being delivered to the refrigerating system, and means operated by the flow of liquid entering said separators for withdrawing air and other non-condensable gases from said refrigerating system.

5. In combination with a refrigerating system, a cooling chamber to which liquid to be cooled is delivered, means for withdrawing vapor and non-condensable gases from said chamber and a condenser to which condensing liquid is delivered communicating with said means, separators through which the liquid to be cooled and the condensing liquid pass prior to being delivered to the refrigerating system, means operated by the flow of liquid entering the separators for withdrawing air and other non-condensable gases from said condenser, and means for withdrawing air and other non-condensable gases from said separators.

6. In combination in a refrigerating system, a cooling chamber to which liquid to be cooled is delivered, means for withdrawing vapor and non-condensable gases from said chamber, a condenser communicating with said means, a separator for withdrawing air and non-condensable gases from the liquid prior to its admission into said chamber, means operated by the flow of water entering said separator for withdrawing air from said condenser and delivering it to said separator, and means for withdrawing the air from said separator to the atmosphere.

7. In combination in a refrigerating system, a cooling chamber, to which liquid to be cooled is delivered, means for withdrawing vapor and non-condensable gases from the liquid prior to its admission into said chamber, a condenser communicating with said means, a separator for withdrawing air and non-condensable gases from the liquid, prior to its admission into said chamber, means operated by the flow of water entering said separator for withdrawing air from said condenser, compressing it and delivering it to an intermediate chamber of said separator and means for withdrawing air from said separator.

8. In a refrigerating system the combination with a condenser of a vacuum chamber connected thereto, an inlet to said vacuum chamber for the liquid to be cooled, an outlet from said chamber for the water vapor and gases and means for removing the air and uncondensed gases from said vacuum chamber and forcing the same into the vacuum chamber of the condenser, a chamber connected with the source of liquid to be cooled, an outlet in said chamber for said liquid leading to the inlet of the vacuum chamber and means for separating the air from the liquid, prior to its entrance into the vacuum chamber.

9. In a refrigerating system the combination with a condenser of a vacuum chamber connected thereto, an inlet into said chamber for the liquid to be treated, an outlet from said chamber, an ejector for withdrawing the air and water vapor from said chamber and forcing the same into the vacuum chamber of the condenser, a chamber connected with the source of condensing liquid, an outlet in said chamber for the liquid leading to the condensing water inlet of the condenser, an air extractor connected to said chamber and means for effecting the passage of the liquid from said chamber into the vacuum chamber of the condenser.

10. In a refrigerating system, the combination with a condenser, of a vacuum chamber connected thereto, an inlet into said chamber for the liquid to be treated, an outlet for the liquid when threated, an ejector for withdrawing the air and water vapor from said chamber and forcing the same into the vacuum chamber of the condenser, a chamber adapted to be connected with the source of liquid to be employed in the condenser, an outlet in said chamber for the liquid leading to the condensing water inlet of the condenser, and an air extractor connected to said chamber for extracting the air and discharging the same into the atmosphere.

11. In a refrigerating system, the combination with a source of supply of cooling liquid, a condenser, of a cooling chamber connected thereto, an ejector for withdrawing the air and water vapor from the cooling chamber and forcing the same into the vacuum chamber of the condenser, an air separating chamber located between the source of liquid to be cooled and the inlet for the liquid into the cooling chamber, an air separating chamber located between the source of supply and the inlet for said liquid into the condenser and means for extracting the air separated from the liquid during its passage through the air separating chambers.

12. In a refrigerating system, the combination with a source of supply of cooling liquid, a condenser, of a cooling chamber connected thereto, an ejector for withdrawing the air and water vapor from the cooling chamber and forcing the same into the vacuum chamber of the condenser, an air separating chamber located between the source of liquid to be cooled and the inlet for the liquid into the cooling chamber, an air separating chamber located between the condenser and the source of supply of cooling liquid, a passage leading from the vacuum chamber of the condenser to each air separating chamber, means located in each separating chamber for withdrawing the air from the vacuum chamber of the condenser and forcing the same into the air separating chambers, a connection between the air separating chambers and an air extractor for extracting the air separated from the liquid in said air separating chambers and the air withdrawn from the condenser and discharging the same into the atmosphere.

13. In a refrigerating system, the combination with a source of supply of cooling liquid, a condenser, of a cooling chamber connected thereto, an ejector for withdrawing air and water vapor from the cooling chamber and forcing the same into the vacuum chamber of the condenser, an air separating chamber located between the source of liquid to be cooled and the inlet for the liquid into the cooling chamber, an air separating chamber located between the condenser and the source of supply of cooling liquid, a passage leading from the vacuum chamber of the condenser to each air separating chamber, a passage connecting the air separating chambers, an air extractor for extracting air separated from the liquid in said separating chambers and the air withdrawn from the condenser and means actuated by the liquid passing into each separating chamber for effecting the withdrawal of the air from the vacuum chamber of the condenser and forcing the same into the air separating chambers.

14. In a refrigerating system, the combination of a source of supply of cooling liquid, a condenser, a cooling chamber connected thereto, an ejector for withdrawing the air and water vapor from the cooling chamber and forcing the same into the vacuum chamber of the condenser, an air separating chamber located between the source of liquid to be cooled and the inlet for the liquid into the cooling chamber, an air separating chamber located between the condenser and the source of supply of cooling liquid, a passage leading from the vacuum chamber of the condenser to each air separating chamber, a nozzle located in each chamber for admitting the liquid to said chambers, a concentrically arranged ejector cone located in each chamber operating in conjunction with the liquid admitted to said chambers to withdraw the air admitted into the condenser and force the same into the air separating chambers, a passage connecting the air separating chambers and an air extractor connected to one of said chambers for extracting the air separated from the liquid in said separating chambers and the air withdrawn from the condenser.

In testimony whereof, I have hereunto subscribed my name this 13th day of September, 1910.

MAURICE LEBLANC.

Witnesses:
P. LEBLANC,
DEAN M. MASON.